US012377841B2

(12) United States Patent
Abroshan et al.

(10) Patent No.: US 12,377,841 B2
(45) Date of Patent: Aug. 5, 2025

(54) VEHICLE SYSTEMS AND METHODS FOR PROBABILISTIC MANEUVER PREDICTION

(71) Applicant: GM GLOBAL TECHNOLOGY OPERATIONS LLC, Detroit, MI (US)

(72) Inventors: Mehdi Abroshan, Waterloo (CA); Khizar Ahmad Qureshi, Pickering (CA); Mohammadali Shahriari, Markham (CA); Puneet Bagga, Etobicoke (CA); Hassan Askari, Thornhill (CA); Ami Woo, Calgary (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 18/333,351

(22) Filed: Jun. 12, 2023

(65) Prior Publication Data
US 2024/0409090 A1   Dec. 12, 2024

(51) Int. Cl.
*B60W 30/095* (2012.01)
*B60W 50/00* (2006.01)
*B60W 50/06* (2006.01)
*B60W 50/14* (2020.01)

(52) U.S. Cl.
CPC .... *B60W 30/0953* (2013.01); *B60W 50/0097* (2013.01); *B60W 50/06* (2013.01); *B60W 50/14* (2013.01); *B60W 2530/00* (2013.01)

(58) Field of Classification Search
CPC ......... B60W 30/0953; B60W 50/0097; B60W 50/06; B60W 50/14; B60W 2530/00
See application file for complete search history.

(56) References Cited

U.S. PATENT DOCUMENTS

| 11,858,536 | B1* | 1/2024 | Liu | G06N 3/0464 |
| 2008/0084283 | A1* | 4/2008 | Kalik | B60Q 9/00 |
| | | | | 701/301 |
| 2017/0249844 | A1* | 8/2017 | Perkins | G06V 20/59 |
| 2018/0025642 | A1* | 1/2018 | Funabashi | G01C 21/26 |
| | | | | 701/301 |
| 2018/0141544 | A1* | 5/2018 | Xiao | G01C 21/3469 |

(Continued)

FOREIGN PATENT DOCUMENTS

DE   102005043838 A1   3/2007

*Primary Examiner* — Naeem Taslim Alam
(74) *Attorney, Agent, or Firm* — Ingrassia Fisher & Lorenz, LLP (57) ABSTRACT

Vehicles and related systems and methods are provided for predicting a future maneuver expected to be executed by a driver. One method involves determining a combined probability for a potential maneuver based on constituent probabilities corresponding to different vehicle state variables, and environmental conditions using one or more tuning parameters specific to the respective combination of maneuver and vehicle state variable, determining an adjusted probability for the potential maneuver based at least in part on the combined probability and one or more contextual state variables corresponding to a current operating context for the vehicle, adapted to driver behavior and driving style, identifying the potential maneuver as an expected maneuver to be executed by a driver of the vehicle based on the adjusted probability, and automatically initiating one or more actions in a manner that is influenced by the expected maneuver.

20 Claims, 5 Drawing Sheets

(56) References Cited

U.S. PATENT DOCUMENTS

| | | | |
|---|---|---|---|
| 2020/0023836 A1* | 1/2020 | Schneider | B60W 50/16 |
| 2020/0148213 A1* | 5/2020 | Gawande | B60W 50/0098 |
| 2020/0164873 A1* | 5/2020 | Nanri | B60W 50/0097 |
| 2021/0247493 A1* | 8/2021 | Agarwal | B60R 11/04 |
| 2022/0055620 A1* | 2/2022 | Gassmann | G06V 20/59 |
| 2022/0223059 A1* | 7/2022 | Kawiecki | G08G 5/57 |

* cited by examiner

VEHICLE SYSTEMS AND METHODS FOR PROBABILISTIC MANEUVER PREDICTION

INTRODUCTION

The technical field generally relates to vehicle systems and more particularly relates to using environmental and contextual variables to probabilistically and adaptively predict a maneuver likely to be performed by a human driver.

Modern vehicles include various enhanced or advanced features to support a human driver operating a vehicle. For example, many vehicles are capable of sensing their environment and facilitating navigation with little or no user input. In this regard, an autonomous vehicle or other vehicle capable of supporting autonomous operating modes senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the number of different variables in a real-world environment, an autonomous vehicle control system may encounter an environment or scenario where assistance may be desired. The ability to predict a maneuver a human driver is about to execute in advance provides an opportunity to improve driver-assistance systems. However, the traffic, road conditions and other obstacles or scenarios that may give rise to the environment or scenario where assistance may be desired also complicate the ability to predict what a human driver is likely to do in response to that environment or scenario. Accordingly, it is desirable to provide vehicle control systems and methods that are capable of reliably predicting human driving behavior to improve user experience.

SUMMARY

Apparatus for a vehicle and related methods and vehicle systems are provided. One method of assisting operation of a vehicle involves a control module associated with the vehicle obtaining, for a plurality of vehicle state variables, a respective current value for the respective vehicle state variable, obtaining one or more contextual state variables corresponding to a current operating context for the vehicle, determining a respective probability for a potential maneuver of a plurality of potential maneuvers for the vehicle based on the respective current value for the plurality of vehicle state variables and one or more tuning parameters associated with the respective combination of the potential maneuver and the respective vehicle state variable, resulting in a plurality of probabilities for the potential maneuver corresponding to the plurality of vehicle state variables, determining a combined probability for the potential maneuver based at least in part on the plurality of probabilities for the potential maneuver corresponding to the plurality of vehicle state variables, determining an adjusted probability for the potential maneuver based at least in part on the combined probability and the one or more contextual state variables corresponding to the current operating context for the vehicle, identifying the potential maneuver as an expected maneuver to be executed by a driver of the vehicle based on the adjusted probability, and automatically initiating one or more actions in a manner that is influenced by the expected maneuver.

In one or more implementations, obtaining the one or more contextual state variables corresponding to the current operating context for the vehicle involves obtaining current values for the one or more contextual state variables that characterize a current environment surrounding the vehicle at a current location at a current point in time. In other implementations, the method involves adjusting a first tuning parameter of the one or more tuning parameters associated with the respective combination of a first maneuver and a first vehicle state variable based on at least one of a driving style and a behavior associated with the driver. In a further implementation, adjusting the first tuning parameter involves adjusting the first tuning parameter to deemphasize the first vehicle state variable when the first vehicle state variable is not correlative to the first maneuver based on a relationship between historical values for the first vehicle state variable and historical maneuvers associated with the driver. In another implementation, adjusting the first tuning parameter involves adjusting the first tuning parameter to increasingly weight the first vehicle state variable when the first vehicle state variable is correlative to the first maneuver based on a relationship between historical values for the first vehicle state variable and historical maneuvers associated with the driver.

In some implementations, automatically initiating the one or more actions involves updating a vehicle path prediction for the vehicle based at least in part on the expected maneuver. In one implementation, updating the vehicle path prediction results in an updated vehicle path prediction, wherein automatically initiating the one or more actions involves autonomously operating one or more actuators associated with the vehicle in a manner that is influenced by the updated vehicle path prediction.

In other implementations, automatically initiating the one or more actions involves automatically generating a user notification for the driver of the vehicle when the expected maneuver violates a safety constraint. In other implementations, automatically initiating the one or more actions involves automatically generating a user notification for the driver of the vehicle when the expected maneuver violates a passenger comfort setting.

In one or more implementations, determining the adjusted probability involves determining an environmental gain factor as a function of the one or more contextual state variables and determining the adjusted probability as a function of the environmental gain factor and the combined probability and the one or more contextual state variables. In one implementation, the one or more contextual state variables include current values for one or more road state variables associated with a current location of the vehicle and the method involves determining the environmental gain factor as a function of the one or more road state variables. In another implementation, the one or more contextual state variables include current values for one or more detected object state variables associated with a current location of the vehicle and the method involves determining the environmental gain factor as a function of the one or more detected object state variables.

In one or more implementations, the method involves dynamically adjusting the one or more tuning parameters a respective maneuver of the plurality of potential maneuvers in response to an observed maneuver different from the expected maneuver. In one implementation, dynamically adjusting the one or more tuning parameters results in one or more driver-specific adapted tuning parameters for the respective combination of the potential maneuver and the respective vehicle state variable, wherein determining the respective probability involves determining the respective probability for the potential maneuver based on the respective current value for the plurality of vehicle state variables and the one or more driver-specific adapted tuning parameters.

An apparatus is also provided for a non-transitory computer-readable medium having executable instructions stored thereon that, when executed by a processor, cause the processor to provide a vehicle path prediction service configurable to obtain, for a plurality of vehicle state variables, a respective current value for the respective vehicle state variable associated with a vehicle, obtain one or more contextual state variables corresponding to a current operating context for the vehicle, determine a respective probability for a potential maneuver of a plurality of potential maneuvers for the vehicle based on the respective current value for the plurality of vehicle state variables and one or more tuning parameters associated with the respective combination of the potential maneuver and the respective vehicle state variable, resulting in a plurality of probabilities for the potential maneuver corresponding to the plurality of vehicle state variables, determine a combined probability for the potential maneuver based at least in part on the plurality of probabilities for the potential maneuver corresponding to the plurality of vehicle state variables, determine an adjusted probability for the potential maneuver based at least in part on the combined probability and the one or more contextual state variables corresponding to the current operating context for the vehicle, identify the potential maneuver as an expected maneuver to be executed by a driver of the vehicle based on the adjusted probability, and automatically initiate one or more actions in a manner that is influenced by the expected maneuver.

In one implementation, the vehicle path prediction service is configurable to determine an environmental gain factor as a function of the one or more contextual state variables and determine the adjusted probability as a function of the environmental gain factor and the combined probability and the one or more contextual state variables. In another implementation, the vehicle path prediction service is configurable to determine the environmental gain factor as a function of current values for one or more road state variables associated with a current location of the vehicle. In another implementation, the vehicle path prediction service is configurable to determine the environmental gain factor as a function of current values for one or more detected object state variables associated with a current location of the vehicle. In yet another implementation, the vehicle path prediction service is configurable to dynamically adjust the one or more tuning parameters a respective maneuver of the plurality of potential maneuvers in response to an observed maneuver different from the expected maneuver.

An apparatus for a vehicle is also provided. The vehicle includes a plurality of sensing devices onboard the vehicle to obtain current values for a plurality of vehicle state variables and a controller coupled to the plurality of sensing devices that, by a processor, is configurable to determine a respective probability for a potential maneuver of a plurality of potential maneuvers for the vehicle based on respective ones of the current values for the plurality of vehicle state variables and one or more tuning parameters associated with the respective combination of the potential maneuver and the respective vehicle state variable, resulting in a plurality of probabilities for the potential maneuver corresponding to the plurality of vehicle state variables, determine a combined probability for the potential maneuver based at least in part on the plurality of probabilities for the potential maneuver corresponding to the plurality of vehicle state variables, determine an adjusted probability for the potential maneuver based at least in part on the combined probability and one or more contextual state variables corresponding to a current operating context for the vehicle, identify the potential maneuver as an expected maneuver to be executed by a driver of the vehicle based on the adjusted probability, and automatically initiate one or more actions in a manner that is influenced by the expected maneuver.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
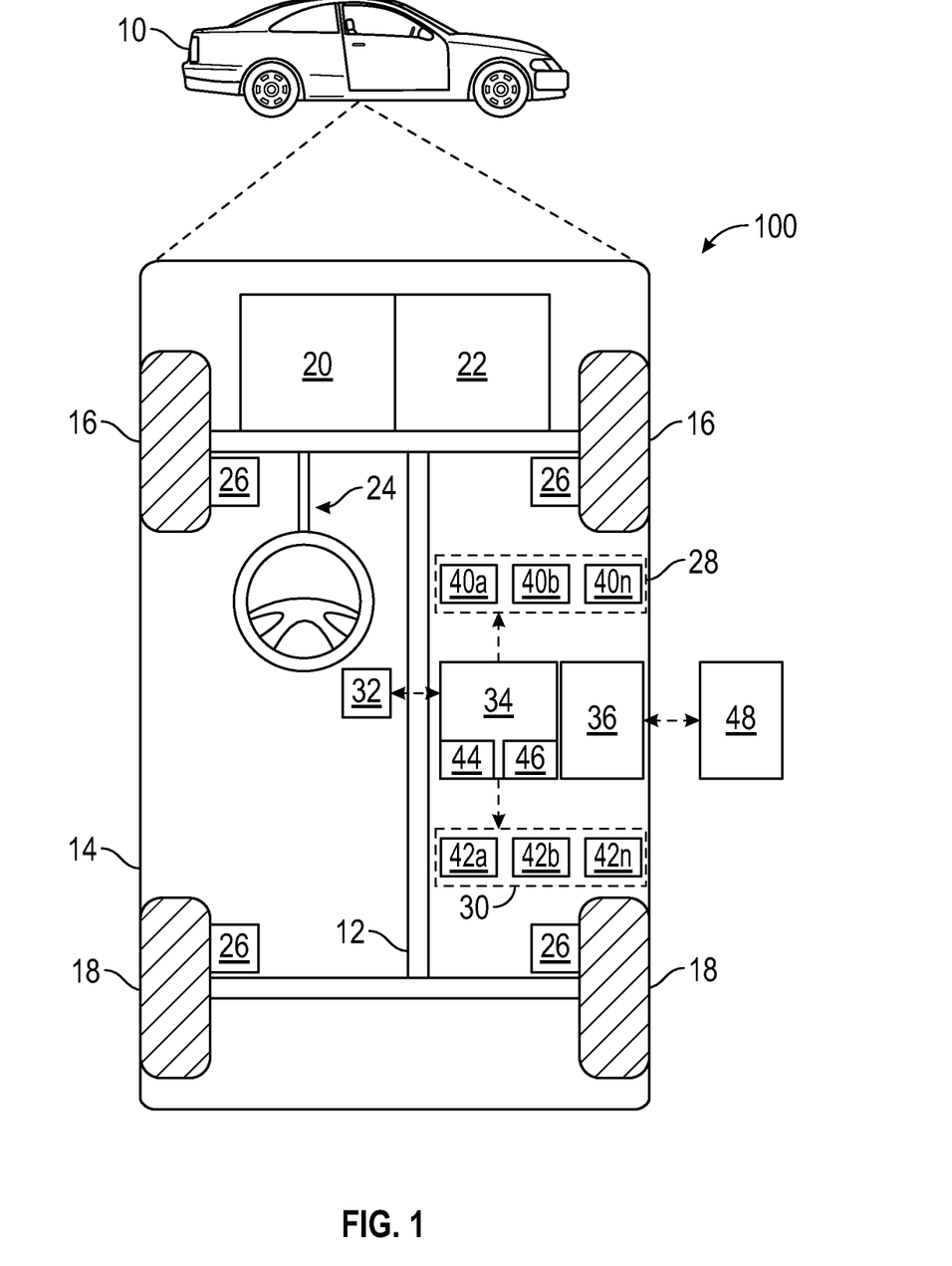
FIG. 1 is a block diagram illustrating a vehicle system in accordance with various implementations.

Referring now to FIG. 1, in accordance with one or more implementations, and vehicle system 100 calculates or otherwise determines a predicted path or trajectory for operating a vehicle 10 along a route to support driver-assistance features or other autonomous operation in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise used with one another based on the calibration for purposes of object detection, object classification, and the resulting driver-assistance features or autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various implementations, one or more instructions of the controller 34 are embodied in the vehicle system 100 (e.g., in data storage element 46) and, when executed by the processor 44, cause the processor 44 to obtain data captured or generated from imaging and ranging sensors 40 and utilize the captured environmental data to determine commands for autonomously operating the vehicle 10, as described in greater detail below.

Still referring to FIG. 1, in exemplary implementations, the communication system 36 is configured to wirelessly communicate information to and from other entities 48 over a communication network, such as but not limited to, other vehicles ("V2V" communication) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
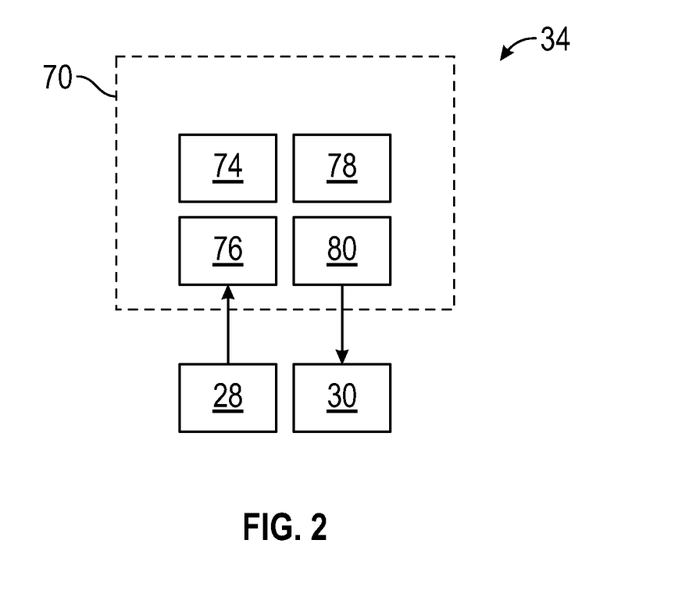
FIG. 2 is a block diagram illustrating a control system suitable for use with a vehicle system in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention or to assist a human driver in connection with controlling or maneuvering the vehicle 10.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In exemplary implementations, the guidance system 78 supports a hands-free autonomous operating mode that controls steering, acceleration and braking while it is enabled and operating to provide lane centering while attempting to maintain a driver-selected set speed and/or following distance (or gap time) relative to other vehicles using the current sensor data (or obstacle data) provided by the sensor fusion system 74 and the current vehicle pose provided by the positioning system 76. For example, the autonomous operating mode may be realized as an adaptive cruise control mode that attempts to maintain the speed of the vehicle substantially constant and equal to a driver-selected set speed while maintaining a desired minimum following distance from a closest in path (CIP) vehicle ahead of the vehicle within a current lane of travel. In various implementations, the guidance system 78 may support various other driver-assistance modes or features that provide guidance to a human driver with respect to steering, acceleration, braking or other operation of the vehicle 10, as described in greater detail below.

In one or more implementations, for purposes of autonomous operation, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles. During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change.

Still referring to FIG. 2, the outputs from the guidance system 78 may be provided to the vehicle control system 80, which employs its own control schemes to generate velocity and/or steering commands that may be provided to the actuators 30, thereby varying the speed and steering of the vehicle 10 to emulate or otherwise effectuate the outputs provided by the guidance system 78. For example, in an autonomous operating mode, the longitudinal and lateral plan outputs from the guidance system 78 are provided to the vehicle control system 80, which may utilize vehicle localization information and its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

Figure 3:
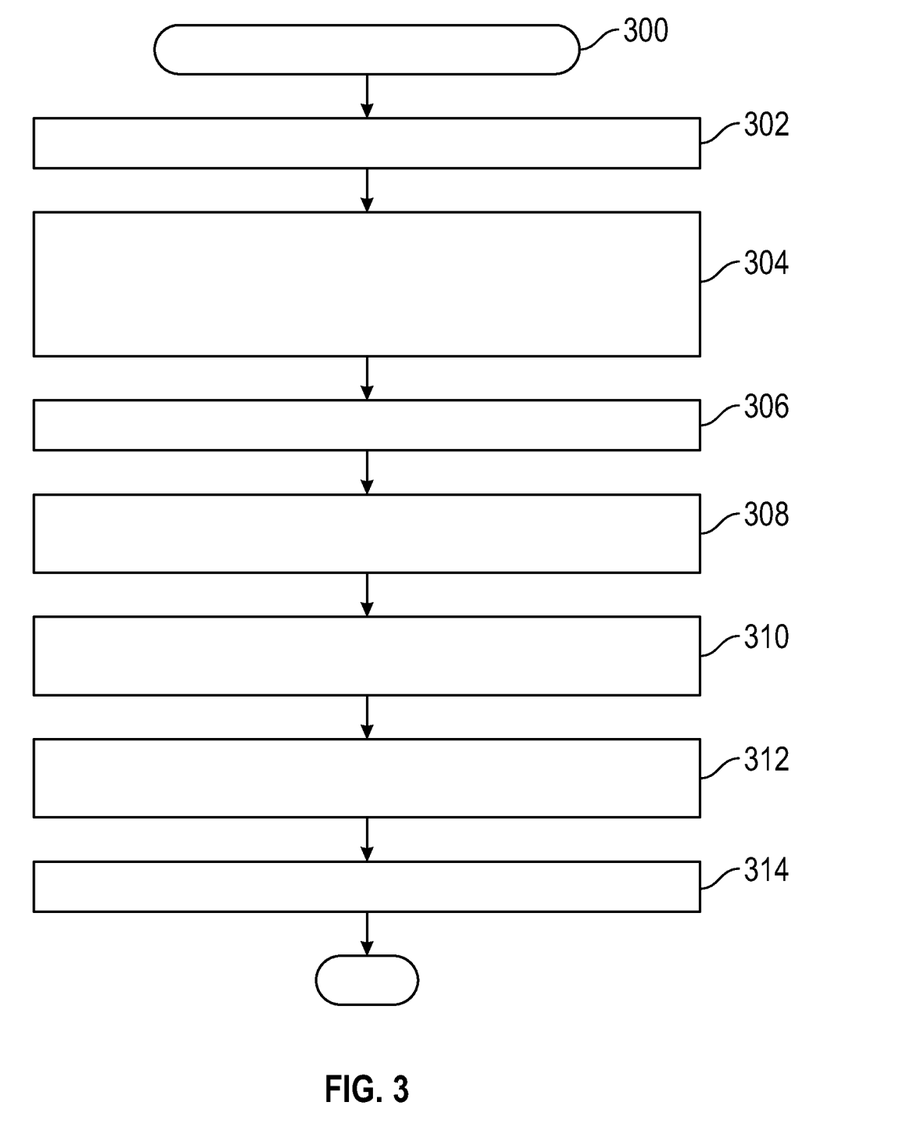
FIG. 3 depicts a flow diagram of a maneuver prediction process suitable for implementation in connection with the vehicle system of FIG. 1 according to one or more implementations described herein.

Referring now to FIG. 3, in exemplary implementations described herein, a vehicle control module (e.g., controller 34) implements an autonomous driving system (e.g., ADS 70), a driver assistance system, or another suitable system that supports a maneuver prediction process 300 and performs additional tasks, functions, and/or operations described herein. The maneuver prediction process 300 probabilistically predicts a type of vehicle maneuver that a human driver is likely to execute in the future in a manner that accounts for the current vehicle state (e.g., the current vehicle speed, the current steering angle, the current torsion bar torque, the current turn signal state, and/or the like) and the current operating environment (e.g., currently detected objects or obstacles in a vicinity of the vehicle, current road characteristics or other road information pertaining to the current location of the vehicle, the current route or other navigation information for the vehicle, etc.). A guidance system (e.g., guidance system 78) or other driver assistance system can utilize the predicted type of future vehicle maneuver the driver is expected to execute to correspondingly update and improve the predicted vehicle path for the vehicle. The updated vehicle path prediction may, in turn, be utilized to trigger or otherwise proactively initiate one or more actions or other vehicle features, such as, for example, steering assistance, braking assistance, and/or the like. For illustrative purposes, the following description may refer to elements mentioned above in connection with FIGS. 1-2. While portions of the maneuver prediction process 300 may be performed by different elements of a vehicle system, for purposes of explanation, the subject matter may be primarily described herein in the context of the maneuver prediction process 300 being primarily performed by a vehicle path prediction service at a vehicle controller 34.

The maneuver prediction process 300 initializes or begins by identifying, receiving or otherwise obtaining current values for vehicle state variables characterizing operation of the vehicle at the current point in time that are predictive of a future vehicle maneuver at 302. In this regard, the vehicle path prediction service at the vehicle controller 34 obtains (e.g., via one or more onboard sensors 28, 40) the current or most recently sampled values for the speed or velocity of the vehicle 10, the current steering angle associated with the steering system 24, the current torque applied to the torsion bar or another vehicle suspension component, the current rate of change associated with the torsion bar torque, the current turn signal state, and/or the like.

After obtaining the current vehicle state variables, the maneuver prediction process 300 continues by calculating or otherwise determining a combined probability of a particular maneuver being executed as a function of the individual vehicle state variables using one or more tuning parameters associated with the particular maneuver at 304. In exemplary implementations, numerous different types of possible maneuvers are defined for purposes of prediction, such as, for example, a right turn, a left turn, a lane change to the right, a lane change to the left, a U-turn to the right, a U-turn to the left, and/or the like, along with a default possibility of no maneuver (or straight path). For each defined type of maneuver, tuning parameters are derived, created or otherwise defined for calculating a probability of that particular maneuver occurring as a function of a particular vehicle state variable using a sigmoid function. The values for the tuning parameters may be calculated, derived or otherwise determined in a maneuver-specific and variable-specific manner based on historical correlations between vehicle state variable values and subsequently observed vehicle maneuvers performed by one or more drivers. For example, in one implementation, an initial training data set of vehicle state variable values and subsequently observed vehicle maneuvers are collected or otherwise obtained for different drivers, where for each driver, driver-specific tuning parameters are derived that result in the highest, maximized or optimized prediction accuracy for the observed vehicle maneuvers by that driver given the respective contemporaneous vehicle state variable values at or before the respective maneuver. The resulting tuning parameter values may then be averaged across all of the different drivers to arrive at an initial values for the tuning parameters that are on average likely to provide a baseline level of prediction accuracy prior to driver-specific adaptations.

As described in greater detail below, for vehicle state variables that are not correlative to or predictive of a particular type of maneuver, the tuning parameters associated with that particular combination of maneuver type and vehicle state variable may be set to respective values that result in the probability function outputting a value of zero (or substantially equal to zero) for that particular vehicle state variable. In one or more exemplary implementations, the tuning parameters are adaptive to reflect the driving style and/or behavior of an individual driver, thereby personalizing the tuning parameters and the resulting maneuver predictions, as described in greater detail below. For example, if the historical behavior associated with a particular driver indicates that the driver misuses the turn signal or otherwise maneuvers the vehicle in a manner that is inconsistent with or contradictory to other inputs from the driver that would otherwise be likely to indicate intent, the respective driver input signal or vehicle state variable may be deemphasized or otherwise negated to reflect the driving style and/or behavior of that particular driver, where for other drivers, the turn signal usage or other indicators of maneuver intent may be more correlative to driver behavior, and therefore, be weighted more heavily for those drivers.

In one or more implementations, the probability of a particular type of maneuver being executed as a function of the current value of an individual vehicle state variable may be calculated or otherwise determined using the equation $$P_{M,x}(k) = \frac{1}{1 + e^{-\beta_{M,x}(|x(k)| - \alpha_{M,x})}},$$

where k represents the particular sampling time, x(k) represents the current value of the respective vehicle state variable at the sampling time (e.g., one of the current vehicle speed, the current steering angle, the current torsion bar torque or the like at time k), $\alpha_{M,x}$ represents the tuning parameter for the sigmoid midpoint for the respective type of maneuver (M) for the respective vehicle state variable (x), and $\beta_{M,x}$ represents the tuning parameter for the sigmoid steepness for the respective type of maneuver (M) for the respective vehicle state variable (x). In this regard, the sigmoid tuning parameters will vary depending on the particular type of maneuver being analyzed and the relative probability or strength of the correlation between that type of maneuver being executed and the respective vehicle state variable.

After determining the different individual probabilities for a particular type of maneuver as a function of the different individual vehicle state variable values, the aggregate or combined probability of that particular type of maneuver being executed may be calculated or otherwise determined in one implementation using the equation $P_M(k) = g_d \Pi_{x=1}^{n} P_{M,x}(k)$, where $P_{M,x}(k)$ represents the different individual probabilities determined based on the different individual vehicle state variable values (e.g., using the sigmoid function set forth above), n represents the number of different individual vehicle state variables, and $g_d$ is a scalar factor corresponding to the maneuver direction (e.g., −1 for a right side maneuver and 1 for a left side maneuver). In this manner, combined maneuver probability for a particular type of maneuver is determined by multiplying values of the individual vehicle state variable maneuver probability values determined using the respective sigmoid probability function for the respective vehicle state variables for that particular type of maneuver.

Still referring to FIG. 3, the maneuver prediction process 300 identifies, receives or otherwise obtains current values for contextual state variables that characterize the current operating context or environment surrounding the vehicle at the current location at the current point in time at 306 and then calculates or otherwise determines adjusted combined probabilities for the different types of maneuvers using an adjusted contextual gain factor at 308. For example, the final adjusted combined probability for a particular type of maneuver may be calculated or otherwise determined using the equation $P_M(k) = g_{M,e} \times g_d \Pi_{x=1}^{n} P_{M,x}(k)$, where $g_{M,e}$ represents an environmental gain factor determined based on the current values for the different contextual state variables that characterize the current operating environment or context. In some implementations, the environmental gain factor is calculated or otherwise determined as a product or combination of different contextual state gain factors using the equation $g_{M,e} = g_{M,r} \times g_{M,s} \times g_{M,n}$, where $g_{M,r}$ represents a probability gain for the particular type of maneuver based on the current values for one or more road state variables (e.g., the type or classification of road, the road curvature, the bank of the road, the grade or pitch of the road, the friction associated with the road surface, and/or the like), $g_{M,s}$ represents a probability gain for the particular type of maneuver based on the current values for one or more object state variables (e.g., the size, type and/or location of detected objects or obstacles in relation to the vehicle), and $g_{M,n}$ represents a probability gain for the particular type of maneuver based on the current route or other navigation information for the vehicle (e.g., whether the planned route or trajectory aligns with the particular type of maneuver). For example, the probability gain of road information ($g_{M,r}$) may be set to relatively lower values for U-turns or other turns when the current road type or classification corresponds to an interstate or a highway where such turns are unlikely or impermissible, while being set to relatively higher values for lane changes or straight maneuvers which are more likely given the current road type. The probability gain of navigation information ($g_{M,n}$) may be set to relatively lower values for maneuvers that are inconsistent with the planned route or navigation information associated with the vehicle (e.g., reducing the gain for a U-turn maneuver when the vehicle is currently traveling along the planned route or in the planned direction), while being set to relatively higher values for maneuvers that are consistent with or otherwise more likely given the planned route (e.g., increasing the gain for a turn or lane change maneuver when a maneuver is required to adhere to the planned route).

Figure 4:
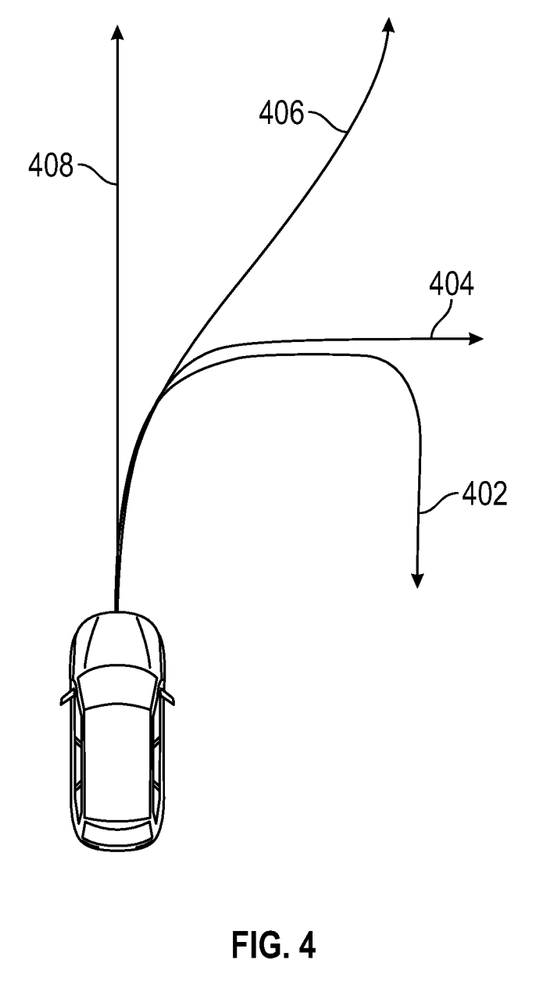
FIG. 4 is a schematic illustrating different types of potential vehicle maneuvers from a current vehicle state suitable for use with the maneuver prediction process of FIG. 3 in accordance with various implementations.

At 310, after determining a contextually-adjusted vehicle state-based probability for the different potential maneuvers, the maneuver prediction process 300 preferentially selects or otherwise identifies the particular potential maneuver having the highest assigned probability based on the current vehicle state and current contextual state as the anticipated vehicle maneuver that is predicted for the vehicle. For example, FIG. 4 depicts an exemplary scenario where based on the current vehicle state and the current environmental state, the vehicle path prediction service determines nonzero probabilities for four different potential maneuvers, a right side U-turn maneuver 402, a right turn maneuver 404, a right side lane change maneuver 406, and a straight maneuver 408 (or no maneuver). In this regard, based on the road information, the route or navigation information and/or detected object information, the contextual gain factors and corresponding maneuver probabilities for left side maneuvers may be reduced or set to zero, for example, due to the absence of an available lane or road to the left side of the vehicle, based on an obstacle or other object detected along the left side of the vehicle (e.g., a semi-truck trailer), and/or the like. Based on the current vehicle speed, the current vehicle steering angle, the current torsion bar torque, the current turn signal state and potentially other vehicle state variables in concert with the current contextual state variables, the vehicle path prediction service may calculate or otherwise determine a probability of 90% for the right side U-turn maneuver 402, 60% for the right turn maneuver 404, 10% for the right side lane change maneuver 406, and 40% for no maneuver 408 to continue straight within the current lane. Accordingly, the vehicle path prediction service identifies the right side U-turn maneuver 402 as the anticipated maneuver that is expected or predicted to be performed by the driver given the current operating context and current vehicle state.

Referring again to FIG. 3, after identifying the highest probability maneuver that is expected to be executed by the driver, the maneuver prediction process 300 automatically updates, augments or otherwise adjusts the vehicle path prediction in a manner that is influenced by the expected maneuver at 312 and automatically initiates or otherwise performs one or more actions responsive to the expected maneuver at 314. For example, referring again to FIG. 4, based on the right side U-turn maneuver 402, the guidance system 78 associated with the ADS 70 may update the motion plan for the vehicle to reflect the right side U-turn maneuver 402, for example, by selecting or otherwise identifying a reference trajectory associated with the right side U-turn maneuver 402 and augmenting or otherwise adjusting the lateral and longitudinal trajectories to better align with a right side U-turn. The guidance system 78 may then provide the updated vehicle motion plan that reflects the updated vehicle path prediction influenced by the expected driver maneuver to the vehicle control system 80. The vehicle control system 80 may then correspondingly update the actuator commands to better align with the updated vehicle path prediction provided by the guidance system 78, for example, by anticipatorily reducing the acceleration or speed commands provided to the throttle or other actuators 30 associated with the propulsion system 20 to proactively decrease the acceleration or speed of the vehicle 10 in anticipation of a forthcoming U-turn maneuver. Similarly, the vehicle control system 80 may anticipatorily vary steering commands or other actuator commands to proactively improve the ability of the driver to safely execute the anticipated U-turn maneuver.

In various implementations, depending on the particular features supported by the vehicle 10, the vehicle control system 80, the ADS 70 and/or the vehicle controller 34 may automatically generate or otherwise provide one or more user notifications to the driver that are influenced by the anticipated maneuver that the driver is expected to execute. For example, in some implementations, the vehicle control system 80 and/or the vehicle controller 34 may be configurable to analyze the updated vehicle path prediction influenced by the predicted maneuver in relation to the current vehicle state to detect or otherwise identify when the vehicle 10 is likely to violate one or more constraints or limits if the maneuver were to be executed. In this regard, the vehicle controller 34 and/or the vehicle control system 80 may generate a notification or warning to the driver of a recommended action to be taken by the driver (e.g., braking) to increase availability of the predicted maneuver or to avoid performing the predicted maneuver when executing the predicted maneuver is likely to result in the vehicle 10 violating one or more user-configured passenger comfort settings (e.g., exceeding a maximum lateral jerk, a maximum longitudinal jerk, and/or the like) and/or violating one or more safety constraints, which may be influenced by contextual state variables (e.g., exceeding a maximum lateral acceleration based on the current roadway curvature, bank, pitch, friction and/or the like) or other environmental conditions (e.g., the predicted vehicle path encroaching within a threshold distance of a detected object or obstacle, roadway boundary, and/or the like). For example, if the current vehicle speed indicates that a maximum longitudinal jerk and/or a maximum lateral jerk passenger comfort setting will likely be violated were the driver to initiate a right side U-turn at the current vehicle speed, the vehicle controller 34 and/or the vehicle control system 80 may automatically generate a notification that suggests the driver apply the brakes or increase braking to reduce the vehicle speed in anticipation of the driver's expected maneuver.

In some implementations, the vehicle controller 34 and/or the ADS 70 utilizes the predicted vehicle maneuver to proactively adjust or alter operation of the onboard sensors 28, 40 and/or the sensor fusion system 74 to improve visibility or coverage of the trajectory corresponding to the predicted vehicle maneuver. For example, when a right side turn or right side U-turn maneuver is predicted, the vehicle controller 34 and/or the ADS 70 may automatically command onboard sensors 28, 40 and/or the sensor fusion system 74 to reorient, reposition or otherwise adjust one or more cameras, image sensors, radar devices, lidar devices and/or the like to increase sensor range or coverage in the maneuver direction, and thereby, increase the captured amount of the trajectory for the predicted vehicle path corresponding to the predicted vehicle maneuver that is encompassed by the field of view of the respective sensor 28, 40. Additionally, or alternatively, the vehicle controller 34 and/or the ADS 70 may automatically command onboard sensors 28, 40 and/or the sensor fusion system 74 to increase the sampling frequency or analysis of spatial regions that align with, overlap or otherwise encompass the trajectory for the predicted vehicle path corresponding to the predicted vehicle maneuver.

For example, when the vehicle 10 is being operated in an autonomous adaptive cruise control mode that attempts to maintain the speed of the vehicle substantially constant and equal to a driver-selected set speed while maintaining a desired minimum following distance from a closest in path (CIP) vehicle ahead of the vehicle within a current lane of travel and the vehicle path prediction service predicts the driver will execute a right side lane change, the updated vehicle path prediction may be utilized by the onboard sensors 28, 40 and/or the sensor fusion system 74 in connection with the autonomous adaptive cruise control mode to identify an updated or anticipated CIP vehicle in the right side lane. The updated CIP vehicle may then be utilized by the adaptive cruise control mode to proactively adjust speed or velocity commands to autonomously control the speed of the vehicle in a manner that achieves the desired tradeoff between the desired minimum following distance from that anticipated CIP vehicle and the driver-selected set speed. It should be appreciated that in practice, there are numerous different ways in which the predicted vehicle maneuver can be utilized to proactively adjust operation of the vehicle, and the subject matter described herein is not limited to any particular practical application for using the predicted vehicle maneuver to improve operation of the vehicle.

Figure 5:
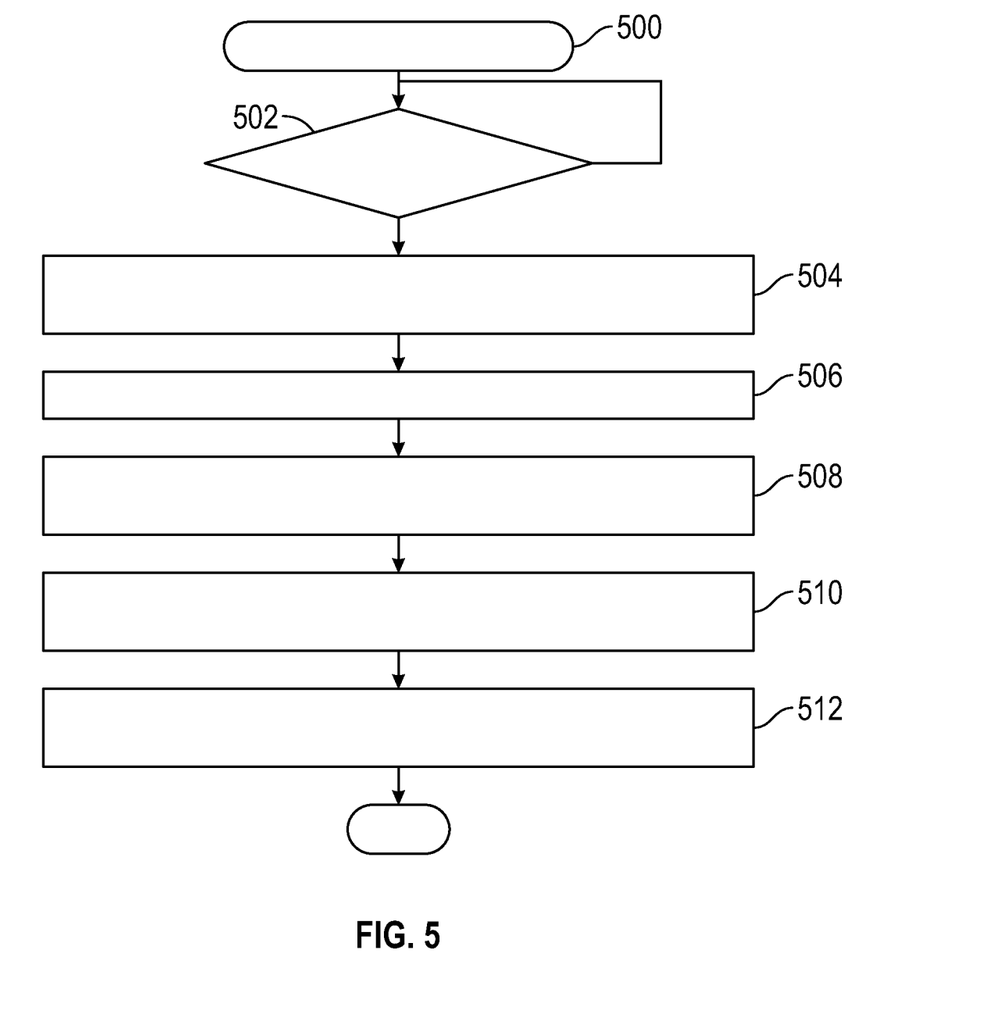
FIG. 5 depicts a flow diagram of an adaptive tuning process suitable for implementation in connection with the maneuver prediction process of FIG. 3 according to one or more implementations described herein.

Referring now to FIG. 5, in one or more exemplary implementations, an adaptive tuning process 500 is implemented or otherwise performed by a vehicle path prediction service in connection with the maneuver prediction process 300 to dynamically and adaptively adjust the maneuver-specific tuning parameters utilized at 304 in a driver-specific manner whenever an observed vehicle maneuver by the driver deviates from an expected maneuver identified by the maneuver prediction process 300. For example, when the maneuver prediction process 300 predicts the absence of a driver maneuver (e.g., a straight maneuver) and a driver manually intervenes to perform a maneuver that was not expected (e.g., a turn or lane change without using a turn signal), the adaptive tuning process 500 may be performed to adjust the tuning parameters for the observed maneuver to improve the performance of the maneuver prediction process 300 over time, for example, by increasing the probability or likelihood of the maneuver prediction process 300 predicting that particular observed maneuver when substantially the same vehicle state and/or contextual state occurs in the future.

As described below, the adaptive tuning process 500 may effectively learn an individual driver's driving style or behavioral patterns, such that the maneuver prediction process 300 can be adapted based on an individual driver's driving style and driving behavior. In this regard, the value for a particular tuning parameter associated with a particular combination of a particular type of maneuver and a particular vehicle state variable may be adjusted to increasingly or decreasingly weight that particular vehicle state variable to thereby emphasize or deemphasize that vehicle state variable based on the degree to which that particular vehicle state variable is predictive of or correlative to that type of maneuver based on the driver's observed driving style and/or behavior. For example, when it is determined that a particular vehicle state variable is not correlative to or predictive of a particular type of maneuver based on a relationship between historical values for that vehicle state variable and driver's historical maneuvers that were contemporaneously observed at those prior instances in time, the tuning parameter for that vehicle state variable with respect to that type of maneuver may be adjusted to deemphasize that vehicle state variable with respect to the likelihood of the driver executing that maneuver. On the other hand, when it is determined that a particular vehicle state variable is correlative to or predictive of a particular type of maneuver based on the relationship between historical values for that vehicle state variable and driver's historical maneuvers, the tuning parameter for that vehicle state variable with respect to that type of maneuver may be adjusted to emphasize or increasingly weight that vehicle state variable with respect to the likelihood of the driver executing that maneuver.

For example, when a particular driver consistently and correctly uses a turn signal or other indicia of an upcoming or intended maneuver, the adaptive tuning process 500 may increase the relative gains or weighting factors associated with the turn signal or other indicia to correspondingly increase the confidence level and accuracy of the predicted maneuver identified by the maneuver prediction process 300 when the driver subsequently manipulates the turn signal or another indicator or to signal an upcoming maneuver. On the other hand, when a particular driver consistently fails to use the turn signal or other indicia of an upcoming or intended maneuver or incorrectly uses the turn signal or other indicia to suggest an intended maneuver that is different from the maneuver the driver actually executed, the adaptive tuning process 500 may decrease the relative gains or weighting factors associated with the turn signal or other indicia to correspondingly deemphasize the turn signal or other inputs to the maneuver prediction process 300 when the driver's behavior or usage of the turn signal or another indicator is not correlative to or predictive of an upcoming maneuver based on the driver's historical behavior. Similarly, the adaptive tuning process 500 may effectively learn or adapt to individual driving styles, for example, when a particular driver executes particular maneuvers at particular vehicle speeds or range of speeds where a particular maneuver would not otherwise be expected for other drivers (e.g., when an individual driver performs a U-turn or other turn at relatively higher speeds), the maneuver prediction process 300 may be more likely to predict a particular type of maneuver that would not otherwise be predicted for most other drivers at a particular vehicle speed.

Referring to FIG. 5 with continued reference to FIGS. 1-4, the illustrated adaptive tuning process 500 begins at 502 by detecting or otherwise identifying when an observed maneuver performed by a driver deviates from the expected driver maneuver that was predicted by the maneuver prediction process 300 for the particular combination of the current vehicle state variables and the current contextual operating state variables. When the adaptive tuning process 500 detects the occurrence of an unexpected maneuver, the Adaptive tuning process 500 continues by buffering, storing or otherwise maintaining the current set of vehicle state variable values and contextual state variable values in association with the observed type of maneuver at 504. For example, the vehicle controller 34 and/or the ADS 70 may store or otherwise maintain, in association with one another, a set of values associated with the observed maneuver that includes the originally predicted probability of the observed maneuver (e.g., from 308 of maneuver prediction process 300), the current vehicle state variable values at the time of the observed maneuver, and the current contextual state variable values at the time of the observed maneuver. In one or more implementations, the adaptive tuning process 500 utilizes a first-in first-out (FIFO) buffer that maintains a fixed number of sets of values associated with an unexpected observed maneuver and evicts older sets of values as more recent instances of the unexpected maneuver occur over time.

The adaptive tuning process 500 calculates or otherwise determines an adjusted sigmoid midpoint tuning parameter for the respective vehicle state variable for the respective maneuver based at least in part on an average of the difference between the respective values of the vehicle state variable and the initial sigmoid midpoint tuning parameter value for that variable over the preceding number of data sets at 506. For example, the adjusted sigmoid midpoint tuning parameter ($\alpha_{M,x}^d$) specific to that particular combination of maneuver (M) and vehicle state variable (x) may be calculated or otherwise determined using the equation $\alpha_{M,x}^d = \alpha_{M,x}^0 + \lambda_{M,x}^\alpha \Delta\alpha_{M,x}$, where $\Delta\alpha_{M,x}$ represents the average of the difference between the respective values of the vehicle state variable and the initial sigmoid midpoint tuning parameter value and $\lambda_{M,x}^\alpha$ represents a learning rate specific to the particular combination of maneuver (M) and vehicle state variable (x) for the sigmoid midpoint tuning parameter. The average of the difference between the respective values of the vehicle state variable and the initial sigmoid midpoint tuning parameter value may be calculated or otherwise determined using the equation $$\Delta\alpha_{M,x} = \frac{\sum_{j=1}^{L}(x(j) - \alpha_{M,x}^0)}{L},$$

where x(j) represents a respective value for the vehicle state variable maintained in the buffer associated with a particular unexpected instance of the observed maneuver and L represents the total number of sets of values maintained in the buffer for preceding unexpected instances of the observed maneuver. The sigmoid midpoint tuning parameter learning rate may be calculated or otherwise determined as a function of the originally predicted probability of the observed maneuver (e.g., from 308 of maneuver prediction process 300) using the equation $$\lambda_{M,x}^\alpha = \frac{K_{M,x}^\alpha}{P_M + \epsilon_{M,x}^\alpha},$$

where $K_{M,x}^\beta$ is a constant gain and $\epsilon_{M,x}^\beta$ is a constant to prevent large learning rates when the maneuver probability ($P_M$) is too low.

The adaptive tuning process 500 calculates or otherwise determines an adjusted sigmoid steepness tuning parameter for the respective vehicle state variable for the respective maneuver based at least in part on a standard deviation of the difference between the respective values of the vehicle state variable and the initial sigmoid steepness tuning parameter value for that variable over the preceding number of data sets at 508. For example, the adjusted sigmoid steepness tuning parameter ($\beta_{M,x}^d$) specific to that particular combination of maneuver (M) and vehicle state variable (x) may be calculated or otherwise determined using the equation $\beta_{M,x}^d = \beta_{M,x}^0 + \lambda_{M,x}^\beta \Delta\beta_{M,x}$, where $\Delta\beta_{M,x}$ represents a multiple of the standard deviation associated with the difference between the respective values of the vehicle state variable and the initial sigmoid steepness tuning parameter value and $\lambda_{M,x}^\beta$ represents a learning rate specific to the particular combination of maneuver (M) and vehicle state variable (x) for the sigmoid steepness tuning parameter, where the sigmoid steepness tuning parameter learning rate may be calculated or otherwise determined as a function of the originally predicted probability of the observed maneuver in a similar manner as set forth above for the sigmoid midpoint tuning parameter learning rate. The multiple of the standard deviation associated with the difference between the respective values of the vehicle state variable and the initial sigmoid steepness tuning parameter value may be calculated or otherwise determined using the equation $$\Delta\beta_{M,x} = K_{M,x}^\beta \sqrt{\frac{\sum_{j=1}^{L}(x(j) - \beta_{M,x}^0)^2}{L}},$$

where $K_{M,x}^\beta$ is a scalar that represents the desired multiple of standard deviations or levels of distribution to be considered in adapting the steepness tuning parameter.

After calculating or otherwise determining adjusted sigmoid tuning parameters, the adaptive tuning process 500 continues at 510 by calculating or otherwise determining final adapted sigmoid tuning parameter values based on the adjusted sigmoid tuning parameters and current road state variable values. For example, the adaptive sigmoid midpoint tuning parameter value may be calculated or otherwise determined as a function of the current road state information and the adjusted sigmoid midpoint tuning parameter value determined at 506 using the equation $\alpha_{M,x} = f(\phi,\rho,\theta,\mu,\alpha_{M,x}^d)$, where $\phi$ represents the current bank of the road, $\rho$ represents the current curvature of the road, $\theta$ represents the current grade or pitch of the road, and $\mu$ represents the current friction of the road. In a similar manner, the adaptive sigmoid steepness tuning parameter value may be calculated or otherwise determined as a function of the current road state information and the adjusted sigmoid steepness tuning parameter value determined at 508 using the equation $\beta_{M,x} = f(\phi,\rho,\theta,\mu,\beta_{M,x}^d)$.

After determining final values for the adaptive sigmoid tuning parameter values, the adaptive tuning process 500 continues at 512 by dynamically updating the tuning parameters that are subsequently utilized for maneuver prediction to the adaptive sigmoid tuning parameter values. In this regard, at 304, subsequent iterations of the maneuver prediction process 300 may utilize the adaptive tuning parameters when calculating the probability of a particular type of maneuver being executed as a function of the current value of an individual vehicle state variable in accordance with the equation $$P_{M,x}(k) = \frac{1}{1 + e^{-\beta_{M,x}(|x(k)|-\alpha_{M,x})}},$$

where $\alpha_{M,x}$ represents the adaptive sigmoid midpoint tuning parameter determined as a function of the driver-adapted sigmoid midpoint tuning parameter ($\alpha_{M,x}^d$) using equation $\alpha_{M,x} = f(\phi,\rho,\theta,\mu,\alpha_{M,x}^d)$ and $\beta_{M,x}$ represents the adaptive sigmoid steepness tuning parameter determined as a function of the driver-adapted sigmoid midpoint tuning parameter ($\beta_{M,x}^d$) using equation $\beta_{M,x}=f(\phi,\rho,\theta,\mu,\beta_{M,x}^d)$ as set forth above. Thus, as the driver executes or otherwise engages unexpected vehicle maneuvers at different vehicle states, the tuning parameters may be dynamically and iteratively adjusted to adapt to better reflect the individual driver's behavior with respect to a particular type of maneuver.

It should be noted that by virtue of the adaptive tuning process 500 in concert with the maneuver prediction process 300, a driver's future maneuvers may be predicted with greater accuracy and reliability, thereby improving vehicle path predictions and enabling proactive actions by the vehicle control system or other driver-assistance features to facilitate the driver's maneuver in an automated manner. Additionally, the maneuver prediction process 300 may adapt to deemphasize or ignore certain state variables that are less influential on the driver's operation of the vehicle (e.g., turn signal usage) and increasingly weight other state variables or road conditions that are more correlative to the driver's operation of the vehicle. Thus, if one driver consistently uses a turn signal incorrectly or inaccurately, the maneuver prediction process 300 may adapt to learn to disregard the turn signal state for certain maneuvers by that driver, while for other driver's that consistently use the turn signal for a particular type of maneuver, the maneuver prediction process 300 may adapt to increasingly weight the turn signal state for that driver.

The maneuver prediction process 300 in concert with the adaptive tuning process 500 described herein results in an algorithmic framework or structure that is holistic in nature, which can be utilized to predict the likelihood of any particular type or classification of maneuver being performed based on any particular type or number of different state variables, while accounting for various different environmental conditions including, but not limited to road conditions, road classification, surrounding or detected objects. In this regard, the equations or algorithms utilized to predict a maneuver may utilize the same form or structure independent of the current vehicle speed, the current vehicle steering angle, and/or the like and contemplate evasive maneuvers or other nonnormative maneuvers, without the maneuver prediction process 300 being limited to use for only certain operating states or environments. In some implementations, the maneuver prediction process 300 may be tailored to provide predicted maneuvers along with the relative probability classified into a particular confidence level (e.g., low, medium, high, etc.), where the confidence level may be utilized in concert with the predicted maneuver to influence various automated driver assistance features such as automated cruise control, automated braking (e.g., automatic emergency braking, crash imminent braking, or the like), automated lane change, assisted steering, evasive steering, collision avoidance, and/or the like. By adapting the maneuver prediction process 300 to the driver's driving style and behavioral patterns, the confidence of the predictions may be increased by filtering out or excluding unreliable indicators of particular maneuvers (e.g., by excluding or deemphasizing turn signal state when a driver does not use a turn signal consistently or correctly). The predicted maneuver that the driver is expected to perform can be utilized to update vehicle path predictions and analyzed with respect to road conditions (e.g., curvature, pitch, surface friction, etc.), surrounding objects, passenger comfort settings or other safety and/or stability constraints to automatically generate a user notification to warn a driver when the expected maneuver is likely to violate one or more alerting thresholds such that the expected maneuver may not be safely and/or comfortably executed given the current vehicle state and operating context.

For sake of brevity, conventional techniques related to driver assistance features, autonomous vehicles, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of assisting operation of a vehicle, the method comprising:
   obtaining, by a processor associated with the vehicle, for a plurality of vehicle state variables, a respective current value for the respective vehicle state variable;
   obtaining, by the processor, one or more contextual state variables corresponding to a current operating context for the vehicle;
   determining, by the processor, a respective probability for a potential maneuver of a plurality of potential maneuvers for the vehicle based on the respective current value for the plurality of vehicle state variables and one or more tuning parameters associated with respective combinations of the potential maneuver and the respective vehicle state variable, resulting in a plurality of probabilities for the potential maneuver corresponding to the plurality of vehicle state variables;
   determining, by the processor, a combined probability for the potential maneuver based at least in part on the plurality of probabilities for the potential maneuver corresponding to the plurality of vehicle state variables;
   determining, by the processor, an adjusted probability for the potential maneuver based at least in part on the combined probability and the one or more contextual state variables corresponding to the current operating context for the vehicle;
   identifying, by the processor, the potential maneuver as an expected maneuver to be executed by a driver of the vehicle based on the adjusted probability;
   adjusting a first tuning parameter of the one or more tuning parameters associated with respective combinations of a first maneuver and a first vehicle state variable based on at least one of a driving style and a behavior associated with the driver; and
   automatically initiating, by the processor, one or more actions including operating one or more actuators associated with the vehicle in a manner that is influenced by the expected maneuver.

2. The method of claim 1, wherein obtaining the one or more contextual state variables corresponding to the current operating context for the vehicle comprises obtaining current values for the one or more contextual state variables that characterize a current environment surrounding the vehicle at a current location at a current point in time.

3. The method of claim 2, wherein the one or more contextual state variables include roadway curvature and roadway bank and the one or more actions are initiated when the roadway curvature or the roadway bank are projected to result in a maximum lateral jerk passenger comfort setting being exceeded.

4. The method of claim 1, wherein adjusting the first tuning parameter comprises adjusting the first tuning parameter to deemphasize the first vehicle state variable when the first vehicle state variable is not correlative to the first maneuver based on a relationship between historical values for the first vehicle state variable and historical maneuvers associated with the driver.

5. The method of claim 1, wherein adjusting the first tuning parameter comprises adjusting the first tuning parameter to increasingly weight the first vehicle state variable when the first vehicle state variable is correlative to the first maneuver based on a relationship between historical values for the first vehicle state variable and historical maneuvers associated with the driver.

6. The method of claim 1, wherein automatically initiating the one or more actions comprises updating a vehicle path prediction for the vehicle based at least in part on the expected maneuver.

7. The method of claim 6, the updating the vehicle path prediction resulting in an updated vehicle path prediction, wherein automatically initiating the one or more actions comprises autonomously operating the one or more actuators associated with the vehicle in a manner that is influenced by the updated vehicle path prediction.

8. The method of claim 1, wherein automatically initiating the one or more actions comprises automatically generating a user notification for the driver of the vehicle when the expected maneuver violates a safety constraint.

9. The method of claim 1, wherein automatically initiating the one or more actions comprises automatically generating a user notification for the driver of the vehicle when the expected maneuver violates a passenger comfort setting.

10. The method of claim 1, wherein determining the adjusted probability comprises:
    determining an environmental gain factor as a function of the one or more contextual state variables; and
    determining the adjusted probability as a function of the environmental gain factor and the combined probability and the one or more contextual state variables.

11. The method of claim 10, the one or more contextual state variables comprising current values for one or more road state variables associated with a current location of the vehicle, wherein the method further comprises determining the environmental gain factor as a function of the one or more road state variables.

12. The method of claim 10, the one or more contextual state variables comprising current values for one or more detected object state variables associated with a current location of the vehicle, wherein the method further comprises determining the environmental gain factor as a function of the one or more detected object state variables.

13. The method of claim 1, further comprising dynamically adjusting the one or more tuning parameters for a respective maneuver of the plurality of potential maneuvers in response to an observed maneuver different from the expected maneuver.

14. The method of claim 13, the dynamically adjusting resulting in one or more driver-specific adapted tuning parameters for the respective combination of the potential maneuver and the respective vehicle state variable, wherein determining the respective probability comprises determining the respective probability for the potential maneuver based on the respective current value for the plurality of vehicle state variables and the one or more driver-specific adapted tuning parameters.

15. A non-transitory computer-readable medium comprising executable instructions that, when executed by a processor, cause the processor to provide a vehicle path prediction service configurable to:
   obtain, for a plurality of vehicle state variables, a respective current value for the respective vehicle state variable associated with a vehicle;
   obtain one or more contextual state variables corresponding to a current operating context for the vehicle;
   determine a respective probability for a potential maneuver of a plurality of potential maneuvers for the vehicle based on the respective current value for the plurality of vehicle state variables and one or more tuning parameters associated with respective combinations of the potential maneuver and the respective vehicle state variable, resulting in a plurality of probabilities for the potential maneuver corresponding to the plurality of vehicle state variables;
   determine a combined probability for the potential maneuver based at least in part on the plurality of probabilities for the potential maneuver corresponding to the plurality of vehicle state variables;
   determine an adjusted probability for the potential maneuver based at least in part on the combined probability and the one or more contextual state variables corresponding to the current operating context for the vehicle;
   identify the potential maneuver as an expected maneuver to be executed by a driver of the vehicle based on the adjusted probability; and
   automatically initiate one or more actions including operating one or more actuators associated with the vehicle in a manner that is influenced by the expected maneuver,
   wherein the vehicle path prediction service is configurable to dynamically adjust the one or more tuning parameters for a respective maneuver of the plurality of potential maneuvers in response to an observed maneuver different from the expected maneuver.

16. The non-transitory computer-readable medium of claim 15, wherein the vehicle path prediction service is configurable to:
   determine an environmental gain factor as a function of the one or more contextual state variables; and
   determine the adjusted probability as a function of the environmental gain factor and the combined probability and the one or more contextual state variables.

17. The non-transitory computer-readable medium of claim 16, wherein the vehicle path prediction service is configurable to determine the environmental gain factor as a function of current values for one or more road state variables associated with a current location of the vehicle.

18. The non-transitory computer-readable medium of claim 16, wherein the vehicle path prediction service is configurable to determine the environmental gain factor as a function of current values for one or more detected object state variables associated with a current location of the vehicle.

19. The non-transitory computer-readable medium of claim 15, wherein the one or more contextual state variables include roadway curvature and roadway bank and the one or more actions are initiated when the roadway curvature or the roadway bank are projected to result in a maximum lateral jerk passenger comfort setting being exceeded.

20. A vehicle comprising:
   a plurality of sensing devices onboard the vehicle to obtain current values for a plurality of vehicle state variables; and
   a controller coupled to the plurality of sensing devices that, by a processor, is configurable to:
      determine a respective probability for a potential maneuver of a plurality of potential maneuvers for the vehicle based on respective ones of the current values for the plurality of vehicle state variables and one or more tuning parameters associated with respective combinations of the potential maneuver and the respective vehicle state variable, resulting in a plurality of probabilities for the potential maneuver corresponding to the plurality of vehicle state variables;
      determine a combined probability for the potential maneuver based at least in part on the plurality of probabilities for the potential maneuver corresponding to the plurality of vehicle state variables;
      determine an adjusted probability for the potential maneuver based at least in part on the combined probability and one or more contextual state variables corresponding to a current operating context for the vehicle;
      identify the potential maneuver as an expected maneuver to be executed by a driver of the vehicle based on the adjusted probability;
      dynamically adjust the one or more tuning parameters for a respective maneuver of the plurality of potential maneuvers in response to an observed maneuver different from the expected maneuver; and
      automatically initiate one or more actions including operating one or more actuators associated with the vehicle in a manner that is influenced by the expected maneuver.

* * * * *